(12) United States Patent
Altman et al.

(10) Patent No.: US 10,346,283 B2
(45) Date of Patent: Jul. 9, 2019

(54) DYNAMICALLY IDENTIFYING PERFORMANCE ANTI-PATTERNS

(71) Applicant: International Business Machines Corporation, Armonk, NY (US)

(72) Inventors: Erik R. Altman, Danbury, CT (US); Hitham Ahmed Assem Aly Salama, Dublin (IE); Nicholas M. Mitchell, Carmel, NY (US); Patrick Joseph O'Sullivan, Dublin (IE); Andres Omar Portillo Dominguez, Dublin (IE); Peter F. Sweeney, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/787,046

(22) Filed: Oct. 18, 2017

(65) Prior Publication Data
US 2018/0039560 A1   Feb. 8, 2018

Related U.S. Application Data

(63) Continuation of application No. 14/977,817, filed on Dec. 22, 2015, now Pat. No. 9,823,994.

(51) Int. Cl.
| | | |
|---|---|---|
| *G06F 11/36* | (2006.01) | |
| *G06F 17/30* | (2006.01) | |
| *G06F 16/22* | (2019.01) | |
| *G06F 11/07* | (2006.01) | |

(52) U.S. Cl.
CPC ...... *G06F 11/3612* (2013.01); *G06F 11/0706* (2013.01); *G06F 11/0793* (2013.01); *G06F 16/22* (2019.01)

(58) Field of Classification Search
CPC ............ G06F 11/3612; G06F 11/0793; G06F 11/0706; G06F 17/30312
USPC ...................................................... 717/131
See application file for complete search history.

(56) References Cited

U.S. PATENT DOCUMENTS

| | | |
|---|---|---|
| 6,851,105 B1 | 2/2005 | Coad et al. |
| 6,931,622 B1 | 8/2005 | Aldrich et al. |
| 7,627,837 B2 | 12/2009 | Zhang |
| 7,756,593 B2 | 7/2010 | Miller |
| 7,818,723 B2 | 10/2010 | AliKacem et al. |
| 8,209,758 B1 | 6/2012 | Doukhvalov et al. |
| 8,543,947 B2 | 9/2013 | Liu et al. |
| 8,590,032 B2 | 11/2013 | Hopen et al. |
| 8,613,041 B2 | 12/2013 | Hopen et al. |

(Continued)

OTHER PUBLICATIONS

Di Marco, A., et al., "A Model-Driven Approach to Broaden the Detection of Software Performance Antipatterns at Runtime", Proceedings of the 11th International Workshop on Formal Engineering Approaches to Software Components and Architectures, Apr. 12, 2014, pp. 1-16.

(Continued)

*Primary Examiner* — John Q Chavis
(74) *Attorney, Agent, or Firm* — Fleit Gibbons Gutman Bongini Bianco PL; Jon A. Gibbons

(57) ABSTRACT

Dynamically identifying performance anti-patterns in a software system is based on a set of documented symptoms that are evaluated in real-time. The evaluation is based on the observed system behavior and its comparison against the documented symptoms of different types of performance issues.

20 Claims, 11 Drawing Sheets

(56) References Cited

U.S. PATENT DOCUMENTS

| | | | |
|---|---|---|---|
| 2003/0191730 A1 | 10/2003 | Adkins et al. | |
| 2011/0265064 A1* | 10/2011 | Hadar | G06F 17/30985 717/121 |
| 2016/0188435 A1 | 6/2016 | Abadi et al. | |
| 2016/0217054 A1* | 7/2016 | Hadar | G06F 17/30985 |
| 2016/0378648 A1* | 12/2016 | Ekambaram | G06F 11/3692 714/38.1 |
| 2017/0060735 A1 | 3/2017 | Yoshida et al. | |
| 2017/0075506 A1 | 3/2017 | O'Doherty et al. | |
| 2017/0132110 A1* | 5/2017 | Ekambaram | G06F 11/3692 |
| 2017/0177461 A1* | 6/2017 | Altman | G06F 11/3612 |

OTHER PUBLICATIONS

Chen, T., et al., "Detecting Performance Anti-Patterns for Applications Developed Using Object-Relational Mapping", 36th International Conference on Software Engineering, May 31-Jun. 7, 2014, pp. 1-12.

Keller, R., et al., "Pattern-Based Reverse-Engineering of Design Components", Proceeding of the 1999 International Conference on Software Engineering, May 16-22, 1999, pp. 1-10.

Lin, C., et al., "Performance Engineering Using Performance Antipatterns in Distributed Systems", Department of Computer Science and Engineering, University of North Texas, The Ninth International Conference on Software Engineering Advances, Oct. 12-16, 2014, pp. 1-10.

Munro, M.,"Product Metrics for Automatic Identification of "Bad Smell" Design Problems in Java Source-Code", 11th IEEE International Metrics Symposium, Sep. 19-22, 2005, pp. 1-9.

Niere, J., et al., "Towards Pattern-Based Design Recovery", Proceedings of the 24th International Conference on Software Engineering, ACM, May 19-25, 2002, pp. 1-11.

Wert, A., "Uncovering Performance Antipatterns by Systematic Experiments", Diploma Thesis at the Department of Informatics Institute for Program Structures and Data Organization, Oct. 1, 2011-Apr. 19, 2012, pp. 1-127.

Jin, G., et al., "Understanding and Detecting Real-World Performance Bugs", Proceedings of the Programming Language Design and Implementation, Jun. 11-16, 2012, pp. 1-11.

Compuware, "Application Performance Management Survey, 2007", http://www.cnetdirectintl.com/direct/compuware/Ovum_APM/APM_Survey_Report.pdf, Last retrieved on Nov. 23, 2015, pp. 1-6.

Notice of Allowance for U.S. Appl. No. 14/977,817 dated Jul. 10, 2017.

* cited by examiner

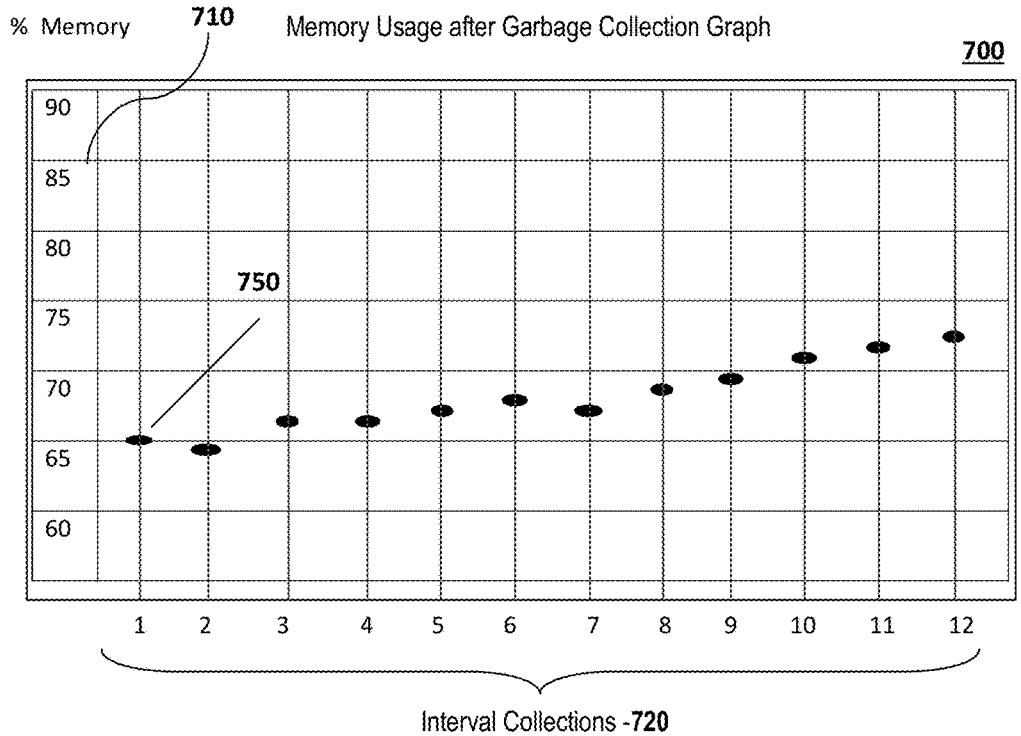

| 400 | | | |
|---|---|---|---|
| | | 410 420 430 440 | |
| Web Application | | | |
| Anti-Pattern | Rule | Tools to Apply | Action |
| RT degradation | Response Time ≤ 1900 ms | I/O diagnostics utility | Report DevOps |
| CPU spikes | CPU usage < 90% | Perf Monitor Applet | Alert SysAdmin |
| Memory ↑ after GC | Heap at least 30% free after GC | javacore dumps | Alert SysAdmin |
| Blocked threads ↑ | No blocked threads | javacore dumps | Increase logging |
| Low workload | Usage must not fall below 90% | Linux "top" command | Alert SysAdmin |

| Node | Performance Issue to Check | Anti-Pattern | Data Tool for DX | Rule | Action to Take | History |
|---|---|---|---|---|---|---|
| Web App | Memory Leak | memory usage after GC completes is increasing | Generate a javacore periodically. | ... | Inform the administrator and/or increase heap size and re-start |  |
| Web App | Deadlock | surge of blocked threads | database logs | ... | Inform the administrator and/or increase DB logging for more verbose information |  |
| Web App | Lock Contention | surge of blocked threads | database logs | ... | Inform the administrator and/or increase DB logging for more verbose information |  |
| Web App | I/O Latency | RT degradation observed | I/O diagnostics utility | ... | Inform the administrator and/or increase DB logging for more verbose information |  |
| Web App | CPU Spikes observed | usage above 80% | PMI from Perf Monitoring subsystem | ... | Inform the Administrator or add more capacity/VMs to system to help scale the load |  |
| Web App | Unresponsive subsystem | subsystem not responding to requests from user or system | PMI from Perf Monitoring subsystem | ... | Inform the administrator and/or re-boot subsystem to re-initialize |  |
| Mail | Number of spawned threads increases beyond acceptable thresholds | unhealthy increase in number of processes/threads beyond expected norms | PMI from Perf Monitoring subsystem | ... | Inform the administrator and/or re-boot subsystem to re-initialize and/or increase thread count beyond default configuration |  |

*FIG. 5A*

| Node | Performance Issue to Check | Anti-Pattern | Data Tool for DX | Rule | Action to Take | History |
|---|---|---|---|---|---|---|
| Web App | heap too small | frequent GCs; little free space avail after GC | javacore | ... | Inform the administrator and/or increase heap size and re-start |  |
| Login | Long Latency | avg RT > 800 ms | monitoring data | ... | Inform the administrator and/or increase DB logging for more verbose information |  |
| Web App | Not enough workload | cpu usage below 50% | ps or sar or PMI | ... | Inform the Administrator or increase workload |  |
| Java* | I/O Latency | RT degradation observed | I/O diagnostics utility | ... | Inform the administrator and/or increase DB logging for more verbose information |  |
| Java* | Memory Leak | memory usage after GC completes is increasing | Generate a javacore periodically. | ... | Inform the administrator and/or increase heap size and re-start |  |
| * | Long Latency | avg RT > 800 ms | monitoring data | ... | Inform the administrator and/or increase DB logging for more verbose information |  |
| * | ... | ... | ... | ... | ... | |

DYNAMICALLY IDENTIFYING PERFORMANCE ANTI-PATTERNS

CROSS-REFERENCE TO RELATED APPLICATIONS

This application is a continuation of and claims priority from prior U.S. patent application Ser. No. 14/977,817, filed on Dec. 22, 2015 the entire disclosure of which is herein incorporated by reference.

BACKGROUND

The present disclosure generally relates to performance testing, and more particularly relates to identifying performance anti-patterns to aid in the identification of performance issues.

Performance is a critical dimension of quality and a major concern of any software project. Performance testing is a complex and time-consuming practice. Every aspect of the design, code, and execution environment of software is influenced by performance Its pervasive nature makes it a critical dimension of quality, especially at enterprise levels, as it plays a central role in software usability. The latest trends in information technology (such as Cloud computing and Service Oriented Architecture) have added to its complexity. Performance issues can materialize into serious problems, such as outages in production environments.

A large body of knowledge exists in the area of pattern detection, as applied to performance testing. In contrast, the literature in the area of anti-pattern detection is not as extensive, yet some knowledge exists. For example, automatic identification of "bad smell" design problems has been documented, using software metrics to develop an interpretation rule framework. Anti-patterns to identify performance issues have not been considered.

BRIEF SUMMARY

Briefly, in one embodiment of the present disclosure, a computer-implemented method identifies performance anti-patterns in a software system. An anti-pattern is a behavioral trend suggestive of a particular performance issue that is likely to lead to system failure. The method includes: selecting a system node to evaluate; providing collection parameters governing the collection of data; and iteratively performing the following steps: collecting the data, then for each anti-pattern documented in the database: selecting a diagnostic tool; using the diagnostic tool, performing a behavioral trend analysis on the collected data to detect presence of the anti-pattern; and performing the remedial action as indicated in the database when the anti-pattern is detected.

According to another embodiment, an information processing system identifies anti-patterns in a software system. The information processing system includes: a global database listing a plurality of anti-patterns; a processor device operably coupled with the memory; and a memory operably coupled with the processor device. The global database lists the anti-patterns and with each anti-pattern, provides: a performance issue for which the anti-pattern is a symptom; a diagnostic tool used for diagnosing the performance issue; history data; and a remedial action to perform when the anti-pattern is detected.

According to another embodiment, a computer program product is used for identifying performance anti-patterns in a software system. An anti-pattern is a behavioral trend suggestive of a particular performance issue that is likely to lead to system failure. The computer program product includes a storage medium readable by a processing circuit and storing instructions for execution by the processing circuit performing a method including steps of: selecting a system node to evaluate; providing collection parameters governing the collection of data; and iteratively performing the following steps: collecting the data; then for each anti-pattern documented in the database: selecting a diagnostic tool; using the diagnostic tool, performing a behavioral trend analysis on the collected data to detect presence of the anti-pattern; and performing the remedial action as indicated in the database when the anti-pattern is detected.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 4 illustrates one example of a rule set for anti-pattern identification, according to one embodiment of the present disclosure;

FIGS. 5A and 5B illustrate examples of anti-pattern database entries, according to one embodiment of the present disclosure;

FIG. 7 is a graph chart of memory usage, according to one embodiment of the present disclosure;

DETAILED DESCRIPTION

Figure 1:
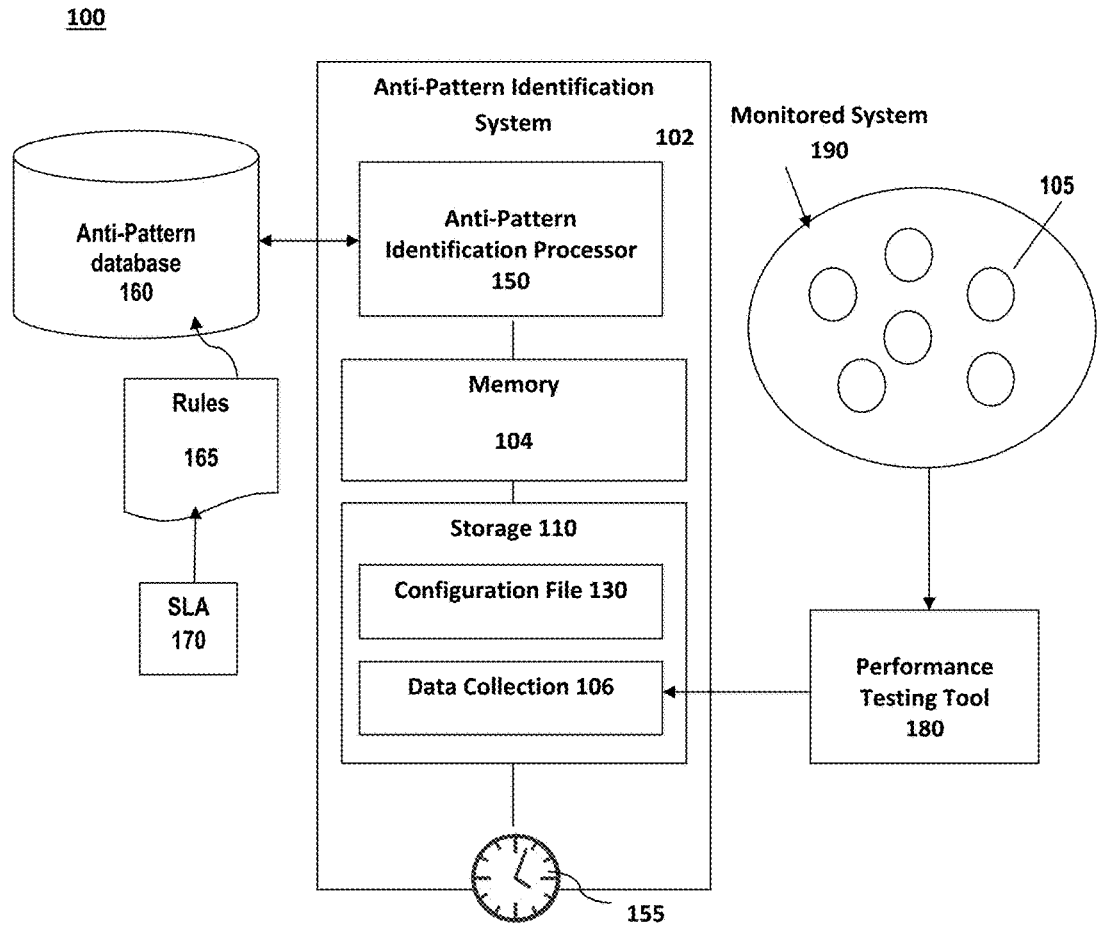
FIG. 1 is a block diagram illustrating one example of an operative environment in which the anti-pattern identification method can be implemented, according to one embodiment of the present disclosure.

In accordance with various aspects of the disclosure, a mechanism, system and method is disclosed for dynamically identifying performance anti-patterns in software. We provide a framework to identify performance anti-patterns based on a set of documented symptoms, which are evaluated in real-time to determine if any performance issues are happening and/or are likely to occur. This evaluation is based on the observed system behavior and its comparison against the documented symptoms of different types of performance issues. Thus, we speed up the identification of performance issues by identifying their anti-patterns.

We define an anti-pattern as a behavioral trend suggestive of a particular performance issue that is likely to lead to system failure. An anti-pattern is a harbinger of a problem, not the problem itself. For example, a memory leak is a problem that can cause a system outage. Memory usage after garbage collection that does not return to its expected low level is the anti-pattern heralding the memory leak. Anti-patterns are symptoms of an unhealthy system, yet they are often ignored.

Applying the disclosed anti-pattern identification method within an existing performance testing framework minimizes the effort invested in performance analysis aimed at identifying performance issues. Because the core process is triggered to run in parallel to a performance testing run, the anti-pattern identification process does not lengthen the scheduled test period. To underscore the advantages of applying anti-pattern identification using a real-world scenario, we consider a Java® web application (such as an IBM® portal instance). Using known methods, assume a tester monitors the performance of the Java® web application and is primarily interested in discerning if the application suffers from memory leaks. The tester periodically generates a javacore file for the Java® application. As just one example, IBM JVM has a mechanism to generate a javacore with a MEMINFO subcomponent in the 'GC History' section which specifies the heap size and number of bytes free after a garbage collection (GC). The tester can examine the "MEMINFO" to determine if the amount of free space after GCs is decreasing and the amount of free space is less than 30%. This can be used to determine a memory leak if the amount of live heap space continues to grow after each GC. As another example, Oracle's HotSpot has the jstat tool which provides a similar analysis.

A memory leak is only one type of performance issue in the vast constellation of performance issues that can affect a web application, and yet the above example describes how cumbersome it can be to test for just one performance issue for one application node. Clearly, it can be appreciated how an in-depth analysis of performance issues can only be manageable by a tester in a relatively small testing environment (probably composed of only a few application nodes). In larger testing environments, such analysis would be too time-consuming and error-prone (due to the vast amount of data to collect and consolidate) to be effective.

We remove the above-stated complexity by adapting an existing testing framework to automatically perform multiple observations and then carry out the recurrent analysis required to detect if any known performance issues (as per the documented symptoms of their respective anti-patterns) are present in the tested system. By providing access to a global repository continually updated with all documented anti-patterns and their diagnostic tools and instructions, we simplify the identification of performance issues of a running system during the execution of one or more applications, by dynamically identifying their respective anti-patterns, before the performance issue leads to a system failure.

The following is a list of terms and their meanings, as used throughout this disclosure:

Glossary anti-pattern—a behavioral trend suggestive of a particular performance issue that is likely to lead to system failure;

deadlock—when two threads attempt to access the same resource at the same time, while each thread is holding a lock the other thread needs to make progress;

javacore—a snapshot of the execution of a java application, which includes the state of each thread and that thread's call stack, and a history of recent garbage collections;

jstat—a command that monitors Java® Virtual Machine (JVM) statistics, by Oracle®;

garbage collection—a memory management method to reclaim memory that is no longer in use but still allocated;

livelock similar to a deadlock, except that the states of the threads are changing, but without making any progress;

performance metrics—quantifiable measures of system performance, such as response time;

response time—the length of time taken to respond to a request;

service level agreement (SLA)—an agreement between a developer and an end user to provide a certain level of service for a product;

throughput—maximum number of users served in a given moment;

Adaptive Workload Operating Environment

Referring now to FIG. 1, there is shown a simplified illustration of an exemplary operating environment 100 in which the anti-pattern identification method can be implemented, according to one embodiment. The operating environment 100 includes an anti-pattern identification system 102 applying the anti-pattern identification method on nodes 105 of a monitored system 190. The anti-pattern identification system 102 is an information processing system configured to implement rules-based anti-pattern identification, according to an embodiment of the present disclosure. The anti-pattern identification system 102 can be implemented within an existing testing or production infrastructure.

Although depicted as a stand-alone system, various embodiments support a transparent integration of the anti-pattern identification system 102 into an existing monitoring environment 190. For example, it is to be understood that in various embodiments the anti-pattern identification system 102 functions as part of, or a wrapper around, a performance test tool 180, with little or no modification to the existing performance test tool 180 required. The anti-pattern identification system 102 includes memory 104 with instructions for performing a dynamic, rules-based, anti-pattern identification method, according to the parameters defined in an anti-pattern database 160. The anti-pattern identification processor 150 is operably coupled with the memory 104 and is configured to execute the instructions from memory 104 for performing the anti-pattern identification method, as disclosed.

The anti-pattern identification system 102 further includes storage 110 configured for storing collected data 106 as required by the anti-pattern identification processor 150. Storage 110 can be configured to include a configuration file 130 setting out the configuration parameters for the anti-pattern identification process. The parameters are configured prior to a test and/or production run and govern the application of the rules 165. For example, the configuration file 130 can include instructions for collecting data 105 used to evaluate system performance from an existing performance test tool 180 in a seamless integration. One example would be to configure the command line options to the WebSphere Application Server V8.5 Liberty to dump javacores at each full GC with this command line option: -Xdump:java:events=fullgc.

The anti-pattern identification processor 150 implements the anti-pattern identification method subject to the configuration parameters set out in a configuration file 130. The configuration file 130 and the rules 165 are depicted as separate blocks for clarity of presentation to underscore their use in the anti-pattern identification method. It is to be understood that the blocks are not to be construed as separate physical, or logical, components. The anti-pattern database 160 can contain the configuration file 130. Also, the configuration file 130 can include a sub-set of the rules 165.

The anti-pattern database 160 contains a set of rules 165 featuring documented symptoms for identifying anti-patterns, and their diagnostic tools. The rules 165 can be expressed as business rules tied to a Service Level Agreement (SLA) 170. Raw data collected from the monitored system 190 is evaluated in real-time according to the rules 165 to determine if any performance issues are happening in a monitored system 190, based on the observed system (or application) behavior. We exploit the available pool of documented performance anti-patterns contained in the database 160 to proactively monitor the system 190, evaluate its behavior (looking for the symptoms of the performance issues), and consequently, expedite the identification of potential performance issues.

The anti-pattern database 160 is a common, unified repository, accessible and available outside of the group, project, or team, which initially created it. In this manner, multiple development teams on various projects share a gained corpus of knowledge to expedite troubleshooting, learning from others and in turn supply their own knowledge. For example, after running a performance test during which an anti-pattern is identified and a history supplying the diagnostic data is added to the database 160, the next team to run a test will now have access to that information. The anti-pattern database 160 is a common global database, The interval timer 155 is operably coupled with the anti-pattern identification processor 150 and can be embodied as a system clock or global clock. The timer 155 is used by the anti-pattern identification processor 150 to schedule data collections at pre-set intervals, as per the stored parameters in the configuration file 130. A performance testing tool 180 routinely collects raw data from system nodes 105. Once the raw data is collected at pre-specified time intervals in data collection 106, the anti-pattern identification processor 150 analyzes the collected data using the diagnostic tools as stored in the database 160 in order to identify any anti-patterns.

The anti-pattern database 160 is first initialized with known anti-patterns and then additional data from subsequent performance test runs is added to the corpus of the database 160. A performance problem that arises in one location is prevented in another location by the timely identification of an anti-pattern.

The anti-pattern identification processor 150 proactively monitors a system 190 for suspicious behavior by applying the diagnostic tools in association with the rules 165 stored in the anti-pattern database 160 to diagnose system behavior, automatically checking for each documented anti-pattern. Then, the anti-pattern identification processor 150 adds to the database 160, providing newer insights to quickly identify future performance problems. By identifying and acting on the anti-patterns, or "symptoms" of a problem early on, the SLA 170 requirements are improved. Anti-patterns are often ignored because they do not always lead to a system crash. Anti-patterns occur before a system crash, therefore by documenting the behavior of the system 190 when an anti-pattern is identified, we document what to look for to avoid the crash.

Figure 2:
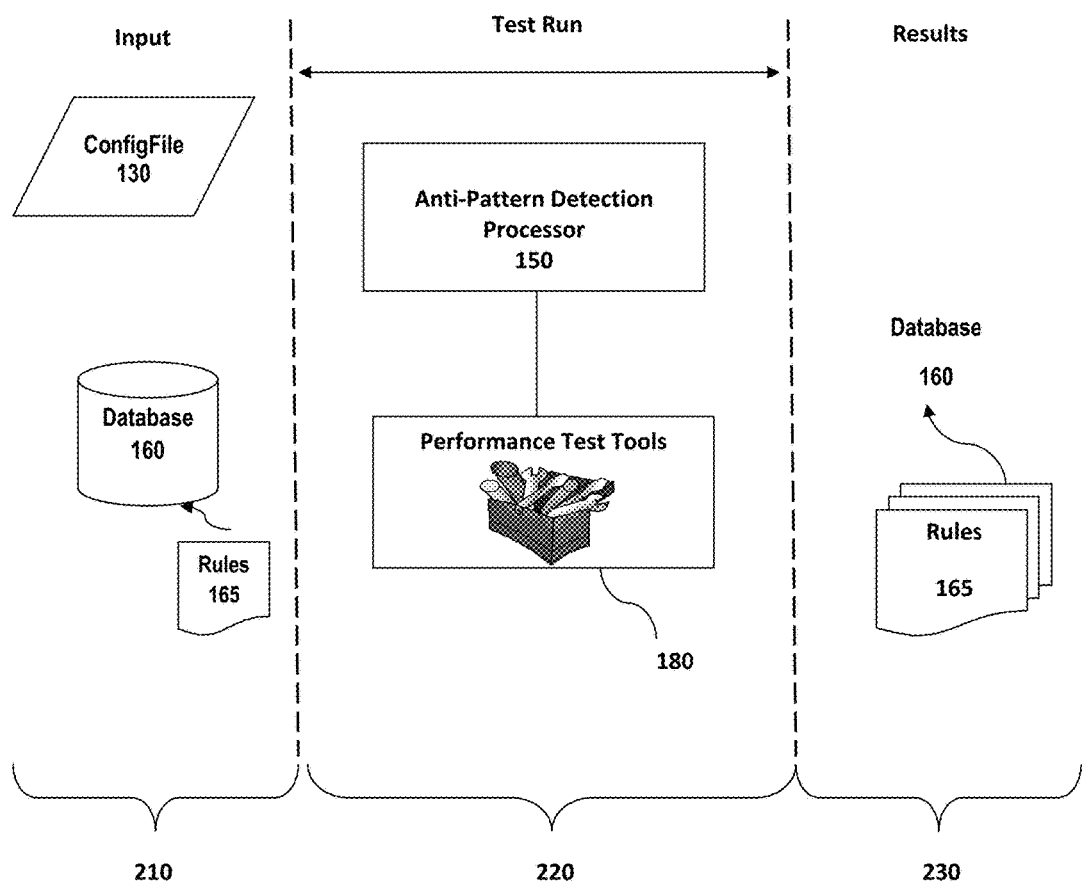
FIG. 2 is a simplified schematic of the anti-pattern identification process requirements, according to one embodiment of the present disclosure.

Anti-Pattern Identification Process Overview—FIG. 2

FIG. 2 shows a simplified, basic process overview 200 of the anti-pattern identification method, according to one embodiment. At a minimum, the inputs to the anti-pattern identification process are: a configuration file 130 containing the configuration parameters. For example, the configuration file 130 can include the instructions for collecting the data from nodes 105, such as the amount of data to collect, the type of data to collect, and the time intervals for collection.

Another input to the process is the existing anti-pattern database 160 with rules 165 populated with data acquired from previous test runs. It will be appreciated that there may be some overlap with the configuration file 130 and the rules set 165. As an example, either one or both the configuration file 130 and the rules set 165 can specify the type of monitoring data to collect.

During the input phase 210 of the process, the tester provides the configuration file 130 and the rules set 165. An initial anti-pattern rule set 165 must be specified prior to the test run 320. During the test run 220, the anti-pattern identification processor 150 evaluates the data 105 collected by the performance test tool 180—to evaluate system behavior. The results of the anti-pattern identification method are the proliferation of the anti-pattern database 160.

Figure 3:
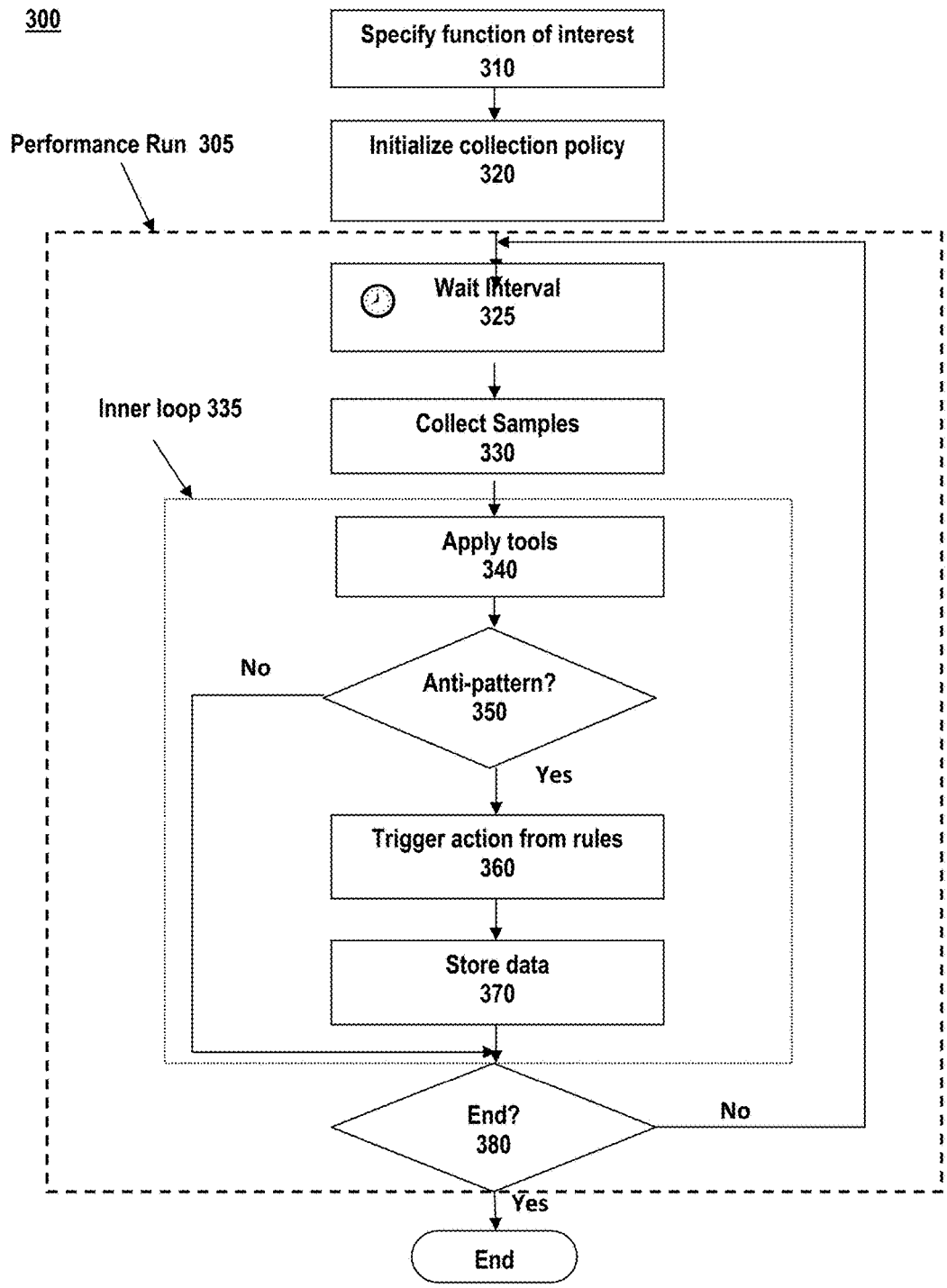
FIG. 3 is an operational flow diagram of the anti-pattern identification method, according to one embodiment of the present disclosure.

Operational Flow Diagram—FIG. 3

FIG. 3 shows an operational flow diagram 300 of the process for dynamic anti-pattern identification for a performance testing tool, according to an embodiment. The process for dynamic anti-pattern identification can run parallel to a performance test run 305 or a production run. The operational flow begins prior to the performance test run 305, at step 310, with the tester initially identifying a chosen function such as 'login', or an application, to evaluate, such as a web application. Multiple functions/applications can be chosen for evaluation. For example, assume a three-tiered application is being tested. We select all three tiers to be evaluated for anti-patterns. In this manner, the tester does not need to run the tests three times, one for each tier. Likewise, a tester wishing to test functions can simultaneously evaluate the login, catalog browse and checkout functions of a web application during one test run.

In step 320 the tester initializes a configuration file 130 and provides access to the set of rules 165 in the database 160. One with knowledge in the art will understand that "providing" the rules set 165 can mean providing the location of the rules set 165. Likewise, "providing" the configuration file 130 can mean providing the location of the configuration file 130, perhaps by providing a pointer to the file 130. At this point the tester can initialize the configuration file to include the sub-set of anti-patterns associated with the tester's area of interest, from the database 160. From a configuration perspective, a tester will select which anti-patterns (among the available database 160) will be evaluated. Additionally, the tester needs to provide any additional parameters required by the chosen anti-patterns.

Once the initialization of the process is complete, the anti-pattern identification process runs in a loop parallel to the performance test execution and/or production run 305. As part of the configuration file 130, a sampling interval time is decided upon so that the node (application or function) under evaluation has some time to process a certain amount of transactions (as per the current system conditions) before any diagnosis is done. In step 325 the process waits the configured wait time, as set forth in the configuration file 130. After waiting the configured wait time in step 325, a set of data samples is collected from the running system 190 in step 330. The data samples can include the monitoring data from the nodes 105 provided by the running performance test tool 180. Alternately, the configuration file 130 can specify the type of data to collect as per the function under test. For example, a tester interested in the performance of a search function can select to collect only data related to the search functionality, and ignore data regarding login procedures.

After waiting the prescribed amount of time (as per the configuration file 130), in step 325, the loop specified in the "test run" 220 is executed (for each node), until the performance testing run finishes: a new set of data samples is collected (as required by the chosen anti-patterns). For purposes of this disclosure, a system node is any addressable component or process that forms a part of a system under test. A system node can include a server, such as a Web server; a directory such as an LDAP directory; an application; a function, such as login; a device such as a printer; and/or a process, to name a few.

The anti-pattern detection processor 150 collects the required data samples in step 330. In one embodiment, logging points in nodes 105 monitored by the performance test tool 180 extract raw data (monitoring data) from the application or system on which the application is running and we periodically collect data samples. Some examples of monitoring data are: a) audit data, such as who and when a configuration parameter of the system is changed; b) transaction (or request) data which measure logical units of work at the application level; c) performance data, such as CPU and memory utilization; d) analytical data, such as page load times for a Web server; and e) event data, such as logging a call to a login service and its return code of success or failure.

Figure 6:
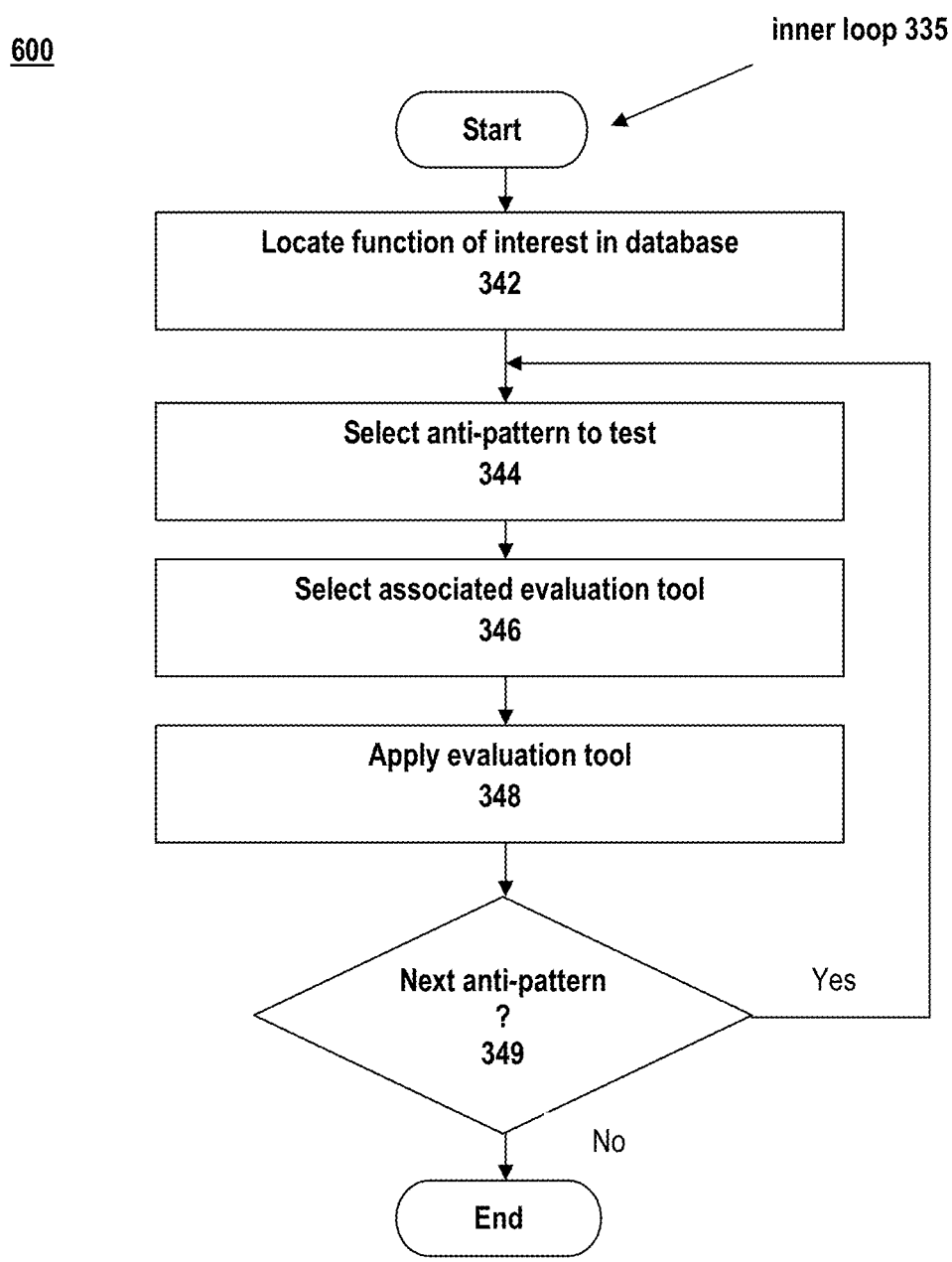
FIG. 6 is an operational flow diagram of the inner loop process of the flow diagram of FIG. 3, according to one embodiment of the present disclosure.

Next begins an inner loop 335 of the process, as shown in FIG. 6, evaluating for all selected anti-patterns. In step 340, using the set of rules 165 from the anti-pattern database 160 as a reference, the anti-pattern detection processor 150 iteratively applies the diagnostic tools as indicated in the rules set 165 to evaluate the existence of all applicable anti-patterns. An anti-pattern is suspected when a rule failure occurs.

If, in decision step 350, an anti-pattern is suspected, then in step 360, the applicable action is triggered and executed as per the rules set 165. In step 370 the data associated with the anti-pattern is stored as history in the anti-pattern database 160 for the benefit of any future test. For example, the history data can be stored as a snapshot, as shown in FIG. 5. Memory or thread snapshots might be aggregated to have history available for trending analysis.

If the performance test run 305 has not ended, as determined in step 380, the process loops back to the wait interval at step 325 to perform another data collection, as per the configuration parameters. The process iteratively continues until the performance task finishes. Furthermore, any exceptions are internally handled and reported, as per the rules set 165.

Application-Based Rule Sub-Set—FIG. 4

FIG. 4 shows one example of a sub-set of rules 165 for a specific application, or function. In this example, the rules 165 are presented as a table 400. A tester wishing to test the performance of a Web application function would rely on this sub-set of rules 165 from the database 160. In one example, the tester can add the information from the table 400 to a configuration file 130, as a script. For example, the script can specify: for each anti-pattern 410, apply the diagnostic tool 430 on the data; if rule 420 fails then perform action 440." The results of the application of the diagnostic tool 430 are stored in the database 160 as history data. The diagnostic tool 430 is run on the history data (from previous runs) and data that has been collected from the system 190.

Anti-Pattern Database Data View—FIGS. 5A and 5B

FIGS. 5A and 5B show a table 500 beginning at FIG. 5A and continued at FIG. 5B, providing one exemplary view of the data that can be stored in the anti-pattern database 160, according to embodiments of the disclosure. FIGS. 6A and 5B show an example of just a portion of an anti-pattern database 160. The table 500 shown in FIGS. 5A and 5B contains limited data; however one can appreciate that the database 160 will contain many more entries, for a wider variety of applications to evaluate.

Specifically, FIGS. 5A and 5B show the documented anti-patterns 410 associated with a Web application, a mail function, a login function, and Java® applications. Some of these are "memory usage after GC completes is increasing," "surge of blocked threads," and so on. Each anti-pattern is listed as a documented symptom 410 (expressed in terms of business rules) to identify a particular performance issue 520 as well as the required data sources and data inputs which need to be provided to evaluate the anti-pattern (the diagnostic tools 430). Some examples of diagnostic tools 430 are javacore dumps to diagnose a Java® memory issue, and javacore dumps to diagnose a deadlock anti-pattern 410 in Java®.

In some cases, an anti-pattern 410 is specific to a particular application or function. For example, the memory leak anti-pattern is specific to an application that uses GC. C++ applications can experience a memory leak; however, the run-time does not support GC, so a memory leak would have to be determined differently for a C++ application. And in some cases, an anti-pattern 410 is applicable to a range of applications or functions. In that case, all applications/functions (nodes 510) that apply to an anti-pattern 410 can be represented with an icon such as an asterisk "*." This is shown in FIG. 5B. Reading the second to the last entry in FIG. 5B, for all applications, the monitoring data should be evaluated to identify the anti-pattern 410 "average response time over 800 milliseconds." FIG. 5B also shows that all Java applications will be evaluated for multiple anti-patterns 410.

For each anti-pattern 410 listed in the database 160 we include following:
1. the specific application or function to run the diagnostics on (node 510);
2. the performance issue 520 for which the anti-pattern 410 is a symptom (e.g. memory leak)
3. an identification of the diagnostic tool 430 required to evaluate the performance issue 520 (e.g. javacore or jstat); not all diagnostic tools 430 apply to each application.
4. the rule 420 to assess the results of applying the diagnostic tool 430 (refer to FIG. 4);

5. the remedial action 440 to take if the anti-pattern 410 is detected by the diagnostic tool 430 (e.g. inform administrator); and 6. history data 560—the data collected by the diagnostic tool 430.

The history data 560 can be used as an audit trail to determine why the remedial action 440 was taken. The history 560 can be used to look at trends that cause the rule to fail. For example, with a memory leak, the history data 560 is the number of bytes of live data after a number of successive GCs. The number of bytes of live data has to be increasing for a memory leak to occur; however, the rate may vary. Looking at the history data 560 can help to tune the parameters of the rule. For example, "how much must live data increase after each GC?" Finally, the history data 560 is needed if the analysis crosses wait intervals. For example, FIG. 7 shows a history of heap usage after GC occurrences, which may span multiple wait intervals.

The remedial action 440 must of course make sense for the type of environment. In a production environment, for example, the action 440 will of course be of a more urgent nature in order to avoid outages. The nature and type of the anti-pattern 410 to evaluate can also motivate the frequency of checks. Some anti-patterns 410 might require daily checks, while others do not. This information is included in the rules 165 and used by a tester in propagating the configuration file 130.

There are multiple types of performance issues 520 that might be good candidates to be used within the disclosed framework. Some examples of such possible performance issues 520 include:

Memory leaks. As previously discussed, a memory leak can be detected by monitoring the behavior of the memory and the garbage collection over time (using javacores as the main data source for the diagnostic analysis). Most production Java® Virtual Machines support, in Linux for example, a kill −3 signal to the JVM to cause it to dump. Alternatively, when an IBM WebSphere® Application Server V8.5 Liberty application is started, the JVM command line argument -Xdump:java:events=fullgc results in a javacore file being generated after every full GC.

Under normal conditions, the non-GC work should dominate. However, if the GC activity increases over time (eventually consuming most of the non-idle CPU cycles), this large increase in GC as time passes would be a strong symptom that the Java® heap is inadequate for the amount of memory required by the workload and transactions currently under test. Therefore, this information would be valuable to a developer to isolate the code responsible for a heap that is too small. Moreover, other different possible actions can be done to mitigate this issue. For example, the heap size might be increased (so that it becomes more appropriate for the current workload), the workload might be adjusted, or a tool such as Yeti (memory usage analysis tool) is applied to diagnose what data structure is growing unbounded.

Lock contention and deadlock—similarly a proactive analysis can be done to the thread usage of an application (e.g. a web application, which is a type of application that commonly processes multiple different requests in parallel and tends to suffer this type of performance issue) to detect if any type of deadlock, livelock or heavy lock contention is occurring. For this analysis, there are different data sources, which might be useful, for example, IBM® Thread and Monitory Dump Analyzer for Java®, which identifies hangs, deadlocks, resource contention, and bottlenecks in Java threads. Based on this information, a trend analysis of blocked threads (threads seeking a lock and not receiving it) could help to identify suspicious threads. For example, if the analysis shows a sudden and sustained surge of blocked threads, one can keep track of those threads, which are keeping the locks. If this behavior continues through time, it is very likely that the application is experiencing some type of lock contention issue in the identified threads.

Not enough workload—as the main objective of a performance testing is normally to stress a system in order to identify whether it is suffering any performance issues, a low utilization of certain resources (such as CPU or memory) might indicate that the current workload is not enough to stress the tested application enough. Therefore, another possible anti-pattern 410 within this framework might be to evaluate the utilization of certain resources over time. If their usage is consistently low during the entire testing period, these symptoms might suggest that the performance problem is not with the application under test, but that the workload received from the load tester is not sufficient to keep the application busy. This would then mean that the server may be over-provisioned for the current workload. Finally, multiple tools can be used to feed this analysis, such as a Unix® shell script (sed or awk) that analyzes the output from an nmon monitor tool.

In summary, by using the above inventive steps, we dynamically identify performance anti-patterns based on a set of documented symptoms which are evaluated in real-time.

Operational Flow Diagram—FIG. 6

FIG. 6 shows a simplified operational flow diagram 600 of the inner loop 335 from the anti-pattern identification process of FIG. 3. The inner loop 335 begins at step 342 by identifying the tester's function, or application, of interest in the anti-pattern database 160. This can be provided as a configuration parameter included in the configuration file 130.

Next, in step 344 the anti-pattern identification processor 150 selects a documented anti-pattern 410 associated with the function of interest. Once the anti-pattern 410 is identified, its associated diagnostic tool 430 is selected in step 346 and applied in step 348. Applying the diagnostic tool 430 can include: a) running scripts (such as sed or awk) which process data collected from the monitored system 190; b) running a Yeti report to process heap dumps; c) using IBM's WAIT tool to process javacores; d) running Java core dump/thread analysis tools; and e) many others.

Next, in step 349 the process checks for any additional anti-patterns 410 associated with the function of interest. If any additional anti-patterns 410 are documented in the database 160, the process loops back to step 344 until all available anti-patterns 410 are examined and the results recorded.

Tracking Memory Usage After Garbage Collection—FIG. 7

Referring now to FIG. 7, we show a graph 700 tracking memory usage after a GC occurs. Interval collections 720 are documented along the x axis, and memory usage percentages 710 along the y axis. Dots 750 mark the memory usage percentage of the heap 710 recorded for each interval collection 720. As previously stated, an anti-pattern 410 is a behavioral trend. It doesn't mean that something is wrong; rather it is a sign that something will go wrong if the trend continues. Starting with the rules 165 stored in the database 160, we proactively look for these issues that may have been missed.

As an example, for Java® memory, one expects that after a GC operation terminates, the memory heap will have no more than 70 percent of memory occupied. We track the memory usage because a memory leak or a heap that is too small issue generally leads to a catastrophic outage. In viewing this graph 700 of memory usage, one would not necessarily become alarmed because the memory usage, as recorded, is well within a "normal" range and shows no disturbing "spikes." Under current testing methodology, no action would be taken.

However, using the anti-pattern identification method, we note from viewing this graph 700 in the history 560 that memory usage has gone up steadily, to 71, then 72, then 73. We identify this as an anti-pattern 410 for a heap that is too small, and take action, as per the specific rule 420. For example, the rule 420 may state simply, "at least 30 percent of the heap must be free after a GC." A rule fail will trigger the associated remedial action 440 which in this example is to "inform the administrator and/or increase heap size and restart." In this way, an outage has been avoided and future testers can benefit from this knowledge. We can demonstrate the memory leak anti-pattern if the "heap too small" continually gets triggered over a short period of time. This indication of a memory leak is detected by examining the history data 560.

The history 560 component of the rules 165 provides historical data that can lead to updates, or refinements to the rules 165. For example, assume that a rule for CPU usage states "CPU can't be more than 90%." The recorded history 440 shows that just before CPU usage jumps to 95 percent utilization, there is a spike from 70% to 90%. Now the tester knows to refine the rule to look for this spike as an anti-pattern 410.

Figure 8:
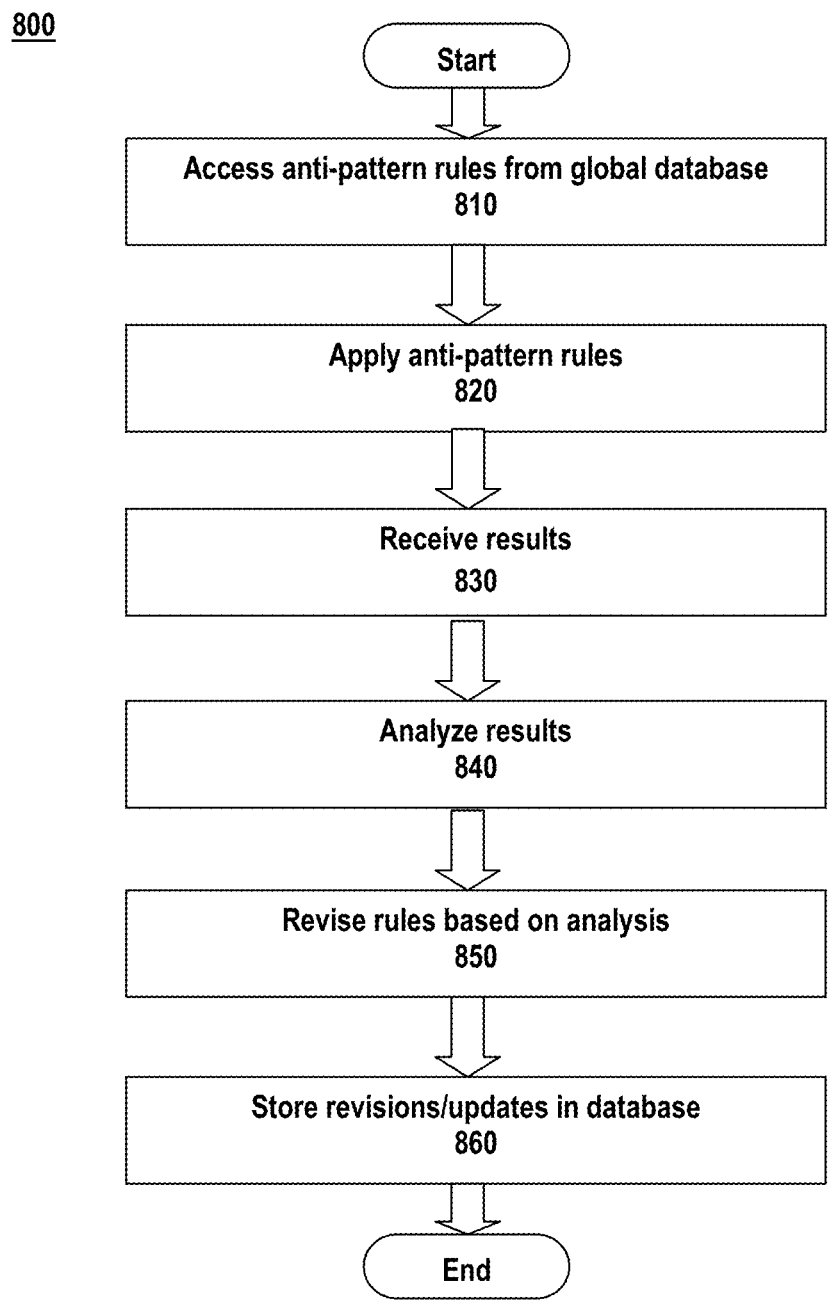
FIG. 8 is an operational flow diagram of the database propagation process for the anti-pattern identification method, according to one embodiment of the present disclosure.

Updating the Rules—FIG. 8

It is anticipated that the anti-pattern identification system 102 will increase its utility over time with continual propagation and calibration of the anti-pattern database 160. FIG. 8 is an operational flow diagram 800 of the process for adding to the anti-pattern database 160. In step 810, the tester first accesses the database 160 in order to obtain the anti-patterns 410 associated with the tester's functionality, or application, of interest.

In step 820, the tester checks for each selected anti-pattern 410 by running the diagnostic tools 430 on the collected data as specified in the rules set 165. In step 830 the tester receives the results from running the diagnostic tools 430, and in step 840 analyzes the results to determine if an anti-pattern 410 is present, and stores the history data 560.

In step 850, depending on the results of the analysis, the tester may revise the rules 165. For example, the tester may decide that corrective action should be taken well before the stated threshold, and therefore revises a rule to consider an anti-pattern in a web application as CPU usage over 80%, rather than 90%. In step 860, the tester stores any additions/revisions/updates in the anti-pattern database 160 for use by others.

Figure 9:
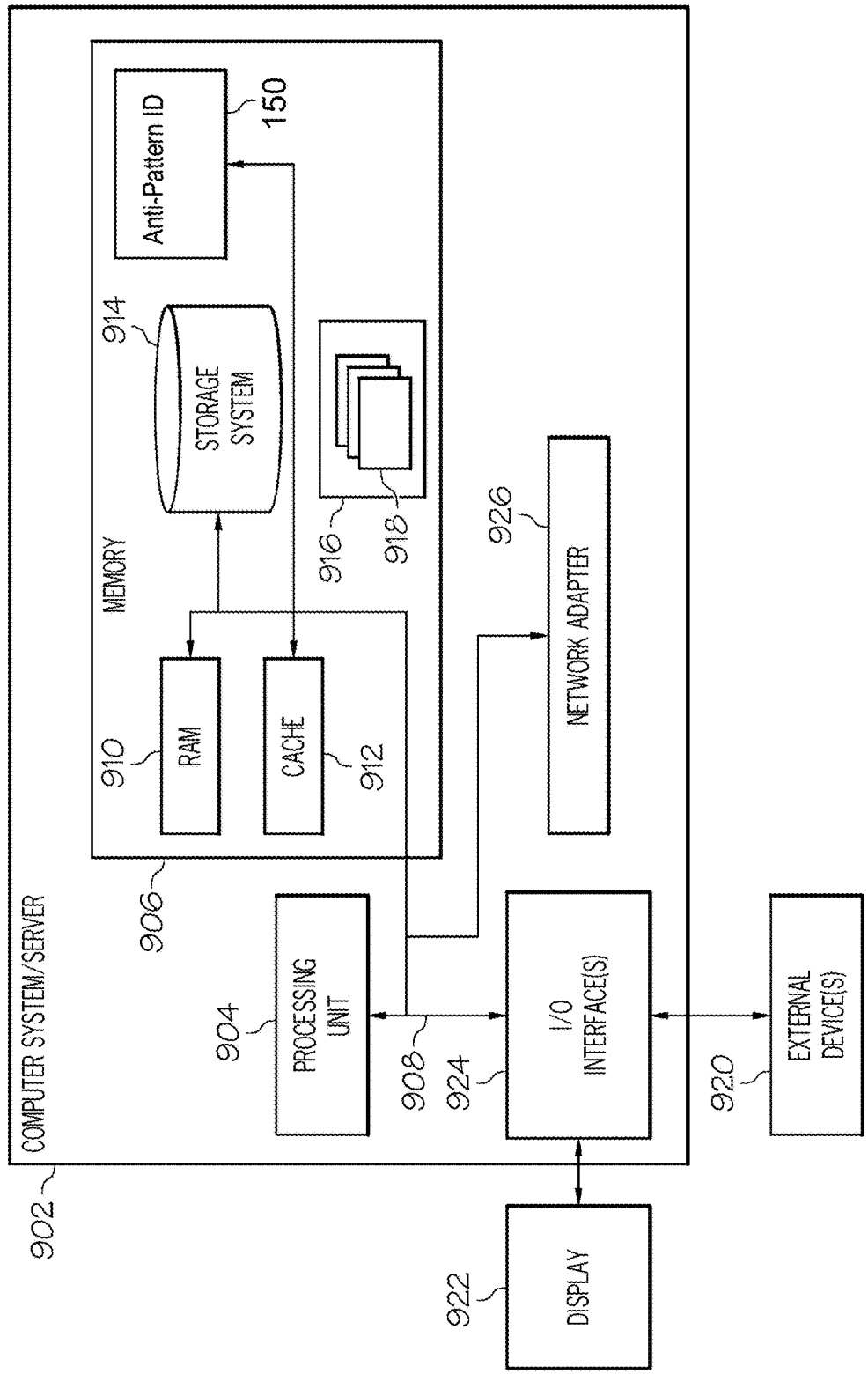
FIG. 9 is a block diagram illustrating a detailed view of an information processing system according to one embodiment of the present disclosure.

Information Processing System Example—FIG. 9

FIG. 9 illustrates one example of an information processing system 902 that can be utilized in various embodiments of the present disclosure. The information processing system 902 shown in FIG. 9 is only one example of a suitable system and is not intended to limit the scope of use or functionality of embodiments of the present disclosure described above. The information processing system 902 of FIG. 9 is capable of implementing and/or performing any of the functionality set forth above. Any suitably configured processing system can be used as the information processing system 902 in embodiments of the present disclosure.

The information processing system 902 is operational with numerous other general purpose or special purpose computing system environments or configurations. Examples of well-known computing systems, environments, and/or configurations that may be suitable for use with the information processing system 902 include, yet limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 902 may be described in the general context of computer system-executable instructions, such as program modules, being executed by a computer system. Generally, program modules may include routines, programs, objects, components, logic, data structures, and so on that perform particular tasks or implement particular abstract data types. The information processing system 902 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 902 is in the form of a general-purpose computing device. The components of the information processing system 902 can include, although are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906, in one embodiment, includes the adaptive workload processor 150 and its components discussed above. Even though FIG. 9 shows the anti-pattern identification processor 150 residing in the main memory, the anti-pattern identification processor 150 or at least one of its components can reside within the processor 904, be a separate hardware component, and/or be distributed across a plurality of information processing systems and/or processors.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present disclosure.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present disclosure.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. The information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, yet are not limited to: microcode, device drivers, redundant processing units, external disk drive arrays, RAID systems, tape drives, and data archival storage systems.

Figure 10:
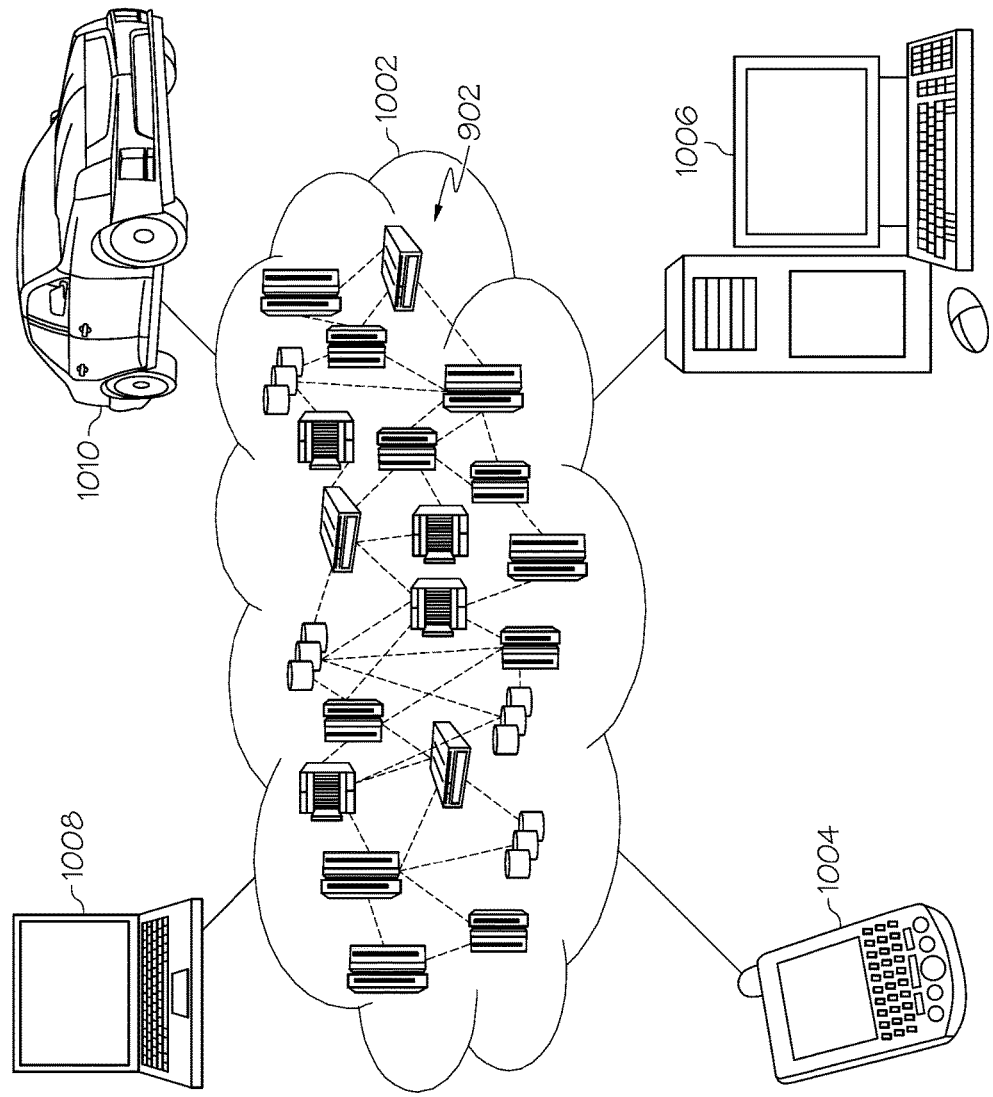
FIG. 10 illustrates one example of a cloud computing environment according to one example of the present disclosure.

Cloud Computing Environment—FIG. 10

It is understood in advance that although the following is a detailed discussion on cloud computing, implementation of the teachings recited herein are not limited to a cloud computing environment. Rather, various embodiments of the present disclosure are capable of being implemented in conjunction with any other type of computing environment now known or later developed. For example, various embodiments of the present disclosure are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present disclosure are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources; however, may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, yet has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure yet has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities yet are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, illustrative cloud computing environment 1002 is depicted. As shown, cloud computing environment 1002 includes one or more information processing systems 902 with which local computing devices used by cloud consumers, such as, for example, personal digital assistant (PDA) or cellular telephone 1004, desktop computer 1006, laptop computer 1008, and/or automobile computer system 1010 may communicate. Each node within the environment 1002 may communicate with one another. They may be grouped (not shown) physically or virtually, in one or more networks, such as Private, Community, Public, or Hybrid clouds as described hereinabove, or a combination thereof. This allows cloud computing environment 1002 to offer infrastructure, platforms and/or software as services for which a cloud consumer does not need to maintain resources on a local computing device. It is understood that the types of computing devices 1004, 1006, 1008, 1010 shown in FIG. 10 are intended to be illustrative only and that computing nodes 902 and cloud computing environment 1002 can communicate with any type of computerized device over any type of network and/or network addressable connection (e.g., using a web browser).

Figure 11:
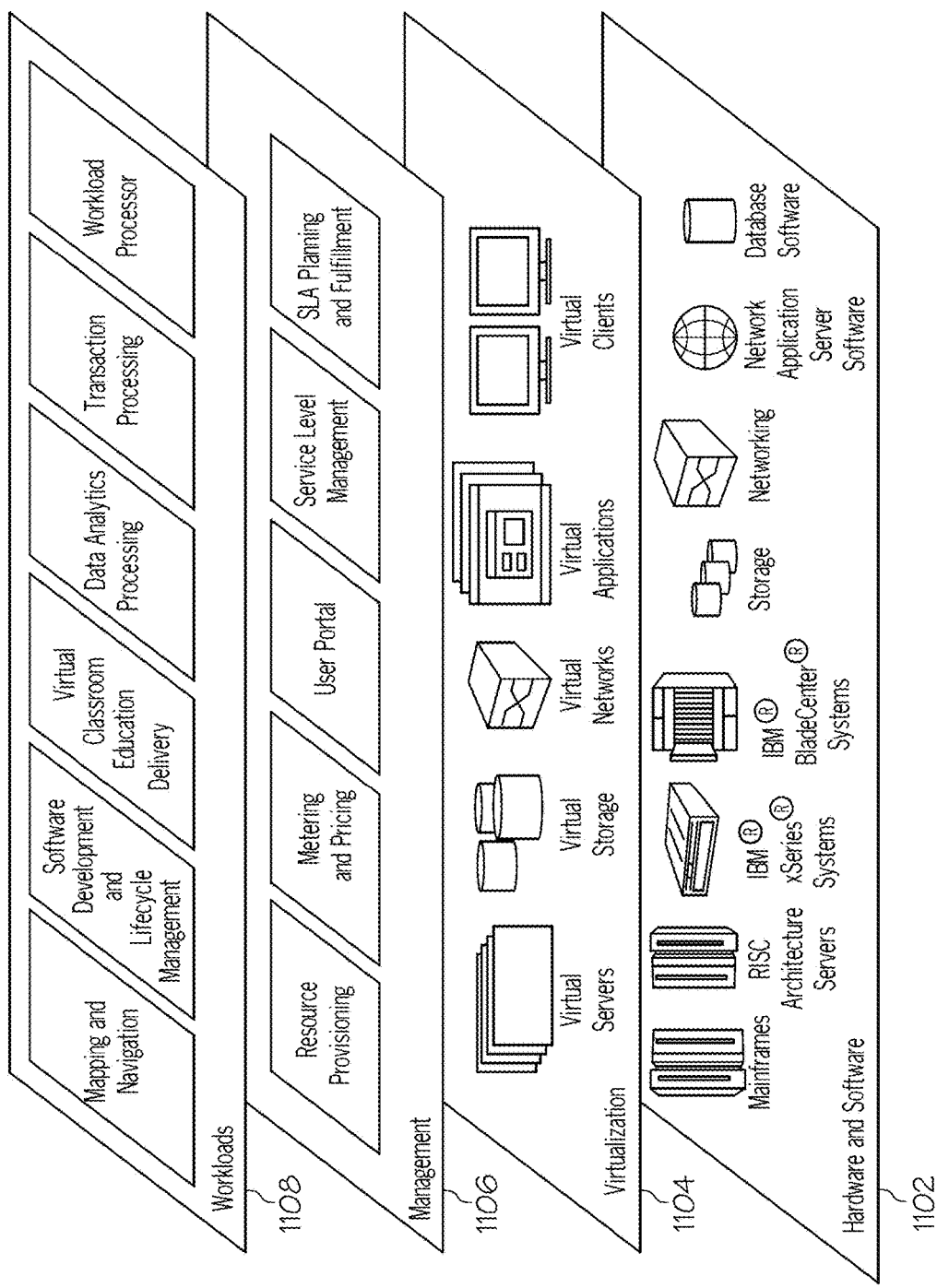
FIG. 11 illustrates abstraction model layers according to one example of the present disclosure.

Referring now to FIG. 11, a set of functional abstraction layers provided by cloud computing environment 1002 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1102 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload processing.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including although not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

The description of the present disclosure has been presented for purposes of illustration and description, however it is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for improving the identification of performance anti-patterns in a software system, comprising:
   using a processor device operably coupled with a global database for evaluating the software system for presence of an anti-pattern, wherein the anti-pattern is a behavioral trend suggestive of a particular performance issue that is likely to lead to system failure, by performing;
   accessing the global database comprising a rules set for each functionality of interest to a software tester, wherein the rules set identifies an anti-pattern listed as a documented symptom for the particular performance issue, wherein the rules set comprises, for each anti-pattern:
      a diagnostic tool to apply to detect the anti-pattern;
      a rule to assess results of applying the diagnostic tool; and
      a remedial action to perform when the anti-pattern is detected; and
   iteratively performing the following at intervals:
      selecting the rules set associated with the functionality of interest;
      collecting data during a performance test run of the software system;
      selecting the diagnostic tool associated with the anti-pattern from the rules set;
      using the diagnostic tool, applying the rule on the collected data to detect presence of the anti-pattern;
      based upon results of the application of the rule, revising the rule to improve identification of the anti-pattern in a subsequent performance test run; and
      adding the collected data to the global database in association with the anti-pattern.

2. The computer-implemented method of claim 1 further comprising preliminary steps of:

populating the global database with identified anti-patterns; and associating the identified anti-patterns in the global database with the diagnostic tools used to identify the anti-patterns.

3. The computer-implemented method of claim 1 wherein detecting the presence of the anti-pattern comprises detecting the behavioral trend from a group consisting of: response time degradation, a surge of blocked threads, an increase in garbage collection activity, and low resource utilization.

4. The computer-implemented method of claim 1 further comprising providing a time interval for collecting the data.

5. The computer-implemented method of claim 1 further comprising sharing the global database among multiple software systems.

6. The computer-implemented method of claim 1 wherein the computer-implemented method is run concurrently within an execution environment.

7. The computer-implemented method of claim 1 wherein selecting the diagnostic tool comprises selecting a thread and dump analyzer tool.

8. The computer-implemented method of claim 2 wherein associating the identified anti-patterns in the global database with the diagnostic tools comprises providing a pointer to the diagnostic tools.

9. The computer-implemented method of claim 1 further comprising expressing the anti-pattern in terms of business rules associated with a service level agreement.

10. The computer-implemented method of claim 1 further comprising:
identifying an additional anti-pattern; and
adding the additional anti-pattern to the global database.

11. The computer-implemented method of claim 1, further comprising:
selecting a system node for evaluating the software system; and
performing a remedial action as indicated in the global database, in association with the anti-pattern.

12. An information processing system for improving the identification of performance anti-patterns in a software system, comprising:
a global database listing a rules set for each functionality of interest to a software tester, wherein each rules set identifies an anti-pattern listed as a documented symptom for the particular performance issue, wherein the rules set comprises, for each anti-pattern:
a diagnostic tool to apply to detect the anti-pattern;
a rule to assess results of applying the diagnostic tool; and
a remedial action to perform when the anti-pattern is detected, wherein an anti-pattern is a behavioral trend suggestive of a particular performance issue that is likely to lead to system failure;
a processor device operably coupled with the global database; and
a memory operably coupled with the processor device, the memory comprising instructions that, when executed by the processor device, cause a computer for evaluating the software system for presence of an anti-pattern to:
iteratively perform the following at intervals:
selecting the rules set associated with the functionality of interest;
collecting data during a performance test run of the software system;
selecting the diagnostic tool associated with the anti-pattern from the rules set;
using the diagnostic tool applying the rule on the collected data to detect presence of the anti-pattern;
based upon results of the application of the rule, revising the rule to improve identification of the anti-pattern in a subsequent test run; and
adding the collected data to the global database in association with the anti-pattern.

13. The information processing system of claim 12 wherein the global database is shared among multiple systems.

14. The information processing system of claim 12 wherein the anti-patterns are expressed in terms of business rules associated with a service level agreement.

15. The information processing system of claim 12 further comprising: selecting a system node for evaluating the software system, wherein the system node is one of: an application and a function.

16. The information processing system of claim 12 wherein the diagnostic tool is a javacore file.

17. The information processing system of claim 12 wherein the behavioral trend is selected from a group consisting of: response time degradation, a surge of blocked threads, an increase in garbage collection activity, and low resource utilization.

18. The information processing system of claim 12 wherein the global database includes a pointer to the diagnostic tool.

19. A computer program product for improving the identification of performance anti-patterns in a software system, the computer program product comprising:
a storage medium readable by a processing circuit and storing instructions for execution by the processing circuit coupled with a global database, for evaluating the software system for presence of an anti-pattern, wherein the anti-pattern is a behavioral trend suggestive of a particular performance issue that is likely to lead to system failure, the instructions comprising:
accessing the global database comprising a rules set for each functionality of interest to a software tester, wherein the rules set identifies an anti-pattern listed as a documented symptom for the particular performance issue, wherein the rules set comprises, for each anti-pattern:
a diagnostic tool to apply to detect the anti-pattern;
a rule to assess results of applying the diagnostic tool; and
a remedial action to perform when the anti-pattern is detected; and
iteratively performing the following at intervals:
selecting the rules set associated with the functionality of interest;
collecting data during a performance test run of the software system;
selecting the diagnostic tool associated with the anti-pattern from the rules set;
using the diagnostic tool applying the rule on the collected data to detect presence of the anti-pattern;
based upon results of the application of the rule, revising the rule to improve identification of the anti-pattern in a subsequent test run; and
adding the collected data to the global database in association with the anti-pattern.

20. The computer program product of claim 19 wherein the behavioral trend is selected from a group consisting of:

response time degradation, a surge of blocked threads, an increase in garbage collection activity, and low resource utilization.

* * * * *